United States Patent
Bottenschein et al.

(10) Patent No.: US 11,092,195 B2
(45) Date of Patent: Aug. 17, 2021

(54) AXIAL BEARING FOR A SHAFT, IN PARTICULAR FOR THE SHAFT OF A HYDRAULIC MACHINE

(71) Applicant: VOITH PATENT GMBH, Heidenheim (DE)

(72) Inventors: Michael Bottenschein, Neu-Ulm (DE); Joerg Haselbauer, Ellwangen (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/764,505

(22) PCT Filed: Nov. 7, 2018

(86) PCT No.: PCT/EP2018/080437
§ 371 (c)(1),
(2) Date: May 15, 2020

(87) PCT Pub. No.: WO2019/096646
PCT Pub. Date: May 23, 2019

(65) Prior Publication Data
US 2021/0156424 A1  May 27, 2021

(30) Foreign Application Priority Data
Nov. 15, 2017 (DE) ...... 10 2017 126 829.4

(51) Int. Cl.
*F16C 27/02* (2006.01)
*F16C 17/04* (2006.01)
(Continued)

(52) U.S. Cl.
CPC ...... *F16C 27/02* (2013.01); *F16C 17/04* (2013.01); *F16C 17/24* (2013.01); *F16C 41/02* (2013.01); *G01B 21/16* (2013.01); *F16C 2360/00* (2013.01)

(58) Field of Classification Search
CPC ...... F16C 17/04; F16C 17/06; F16C 17/24; F16C 27/02; F16C 41/00; F16C 41/02; F16C 2360/00; G01B 21/16
See application file for complete search history.

(56) References Cited

U.S. PATENT DOCUMENTS 2,225,835 A * 12/1940 Howarth ...... F16C 17/06
384/224
4,168,101 A 9/1979 DiGrando
(Continued)

FOREIGN PATENT DOCUMENTS

CN 1805055 A 7/2006
CN 101029659 A 9/2007
(Continued)

OTHER PUBLICATIONS

Machine Translation of JP-60023622-A (Year: 1985).*

*Primary Examiner* — Alan B Waits
(74) *Attorney, Agent, or Firm* — Laurence A. Greenberg; Werner H. Sterner; Ralph E. Locher

(57) ABSTRACT

An axial bearing for absorbing high axial loads of a shaft has a support structure and a load transmission device for transmitting the load from the shaft to the support structure. The support structure includes a bearing plate, a plurality of spring elements, and a plurality of bearing shoes. The spring elements are supported on the bearing plate and arranged in groups, and each group of spring elements being covered by a bearing shoe. The load transmission device is firmly connected to the shaft and has a tracking ring which is arranged such that the tracking ring can rotate on the bearing shoes. The bearing plate and the tracking ring are in each case arranged concentrically with the shaft, and the axial bearing has an advantageously designed measuring device for measurement of the mean distance between the bearing plate and a bearing shoe.

7 Claims, 4 Drawing Sheets

(51) Int. Cl.
*F16C 41/02* (2006.01)
*F16C 17/24* (2006.01)
*G01B 21/16* (2006.01)

(56) References Cited

U.S. PATENT DOCUMENTS

| | | | |
|---|---|---|---|
| 4,323,286 A * | 4/1982 | Vohr | F16C 33/108 |
| | | | 384/317 |
| 4,915,512 A | 4/1990 | Hilby et al. | |
| 5,269,617 A | 12/1993 | Urban et al. | |
| 7,939,937 B2 | 5/2011 | Holzmann et al. | |
| 10,444,118 B2 | 10/2019 | May et al. | |
| 2005/0013521 A1 | 1/2005 | Koshimura et al. | |
| 2006/0171617 A1* | 8/2006 | Cross | F16C 17/06 |
| | | | 384/122 |
| 2007/0217722 A1 | 9/2007 | Bohmann | |
| 2011/0038574 A1 | 2/2011 | Bottenschein | |
| 2011/0123327 A1* | 5/2011 | Dewhurst | F01D 25/168 |
| | | | 415/229 |
| 2016/0312835 A1 | 10/2016 | Nicolas et al. | |
| 2018/0031041 A1 | 2/2018 | Brady | |
| 2019/0072134 A1* | 3/2019 | Rajendran | F16C 33/20 |
| 2019/0085831 A1* | 3/2019 | Frydendal | F16C 41/00 |

FOREIGN PATENT DOCUMENTS

| | | | | |
|---|---|---|---|---|
| CN | 101567223 A | 10/2009 | | |
| CN | 101818755 A | 9/2010 | | |
| CN | 105283671 A | 1/2016 | | |
| CN | 106065903 A | 11/2016 | | |
| CN | 106403898 A | 2/2017 | | |
| CN | 107250584 A | 10/2017 | | |
| DE | 332736 C | 2/1921 | | |
| DE | 935037 C | 11/1955 | | |
| DE | 2626609 C3 | 1/1982 | | |
| DE | 102007028456 A1 | 12/2008 | | |
| EP | 3388566 A2 | 9/1990 | | |
| EP | 2051054 A1 | 4/2009 | | |
| JP | 60023622 A * | 2/1985 | | F16C 17/24 |
| JP | H031 86609 A | 8/1991 | | |
| JP | H10246225 A | 9/1998 | | |
| JP | 2007151205 A | 6/2007 | | |
| WO | 2007131823 A1 | 11/2007 | | |
| WO | 2008015502 A1 | 2/2008 | | |

* cited by examiner

AXIAL BEARING FOR A SHAFT, IN PARTICULAR FOR THE SHAFT OF A HYDRAULIC MACHINE

BACKGROUND OF THE INVENTION

Field of the Invention

The invention relates to an axial bearing for absorbing high axial loads.

Such bearings are used for example for water turbines, pumps or pump turbines with vertical shafts.

The bearing essentially comprises a support structure and a load transmission device for transmitting the axially acting load from a rotating shaft to the support structure. The support structure comprises the bearing plate and a plurality of spring elements which are supported on the bearing plate. The spring elements are usually arranged in groups and covered by a bearing shoe. The load transmission device is firmly connected to the shaft and comprises a tracking ring which can rotate on the bearing shoes. In order for a hydrodynamic lubricating film to form between the tracking ring and the bearing shoes on all bearing shoes during operation, the supporting spring elements must allow the bearing shoes to tilt and compensate for manufacturing and assembly tolerances by means of axial flexibility. Spiral or Belleville springs or rubber elements can be used as spring elements. To this end, reference is made to documents U.S. Pat. No. 4,168,101, DE 26 26 609 C3, WO 2008/15502 A1, DE 935 037 and DE 332 736.

The design of the bearing essentially depends on the expected axial load. There are applications in which the loads occurring during operation are not exactly known, or can fluctuate greatly during operation. In water turbines, pumps or pump turbines, the load changes quite considerably as a result of the water flow that is added during operation. This difference is often over 100%. A higher axial load leads to a higher bearing temperature, which can lead to damage to the bearing if the loads are too high. In such cases, it is therefore desirable to measure the actual axial load. In the past, the axial load was measured indirectly, e.g. by measuring a deformation of elements that support the support structure. Such measurements are not very accurate and complex.

SUMMARY OF THE INVENTION

It is the object of the inventors to specify an axial bearing in which the axial load can be measured much more easily.

The inventors have recognized that the object can be achieved by an axial bearing as claimed. Advantageous embodiments result from the dependent claims.

BRIEF DESCRIPTION OF THE SEVERAL VIEWS OF THE DRAWING

The solution according to the invention is explained below with reference to figures. The following is shown in said figures:

s FIG. 1 hydropower plant with an axial bearing;
FIG. 6 measuring device for measuring the distance between bearing plate and bearing shoe.

DETAILED DESCRIPTION OF THE INVENTION

Figure 1:
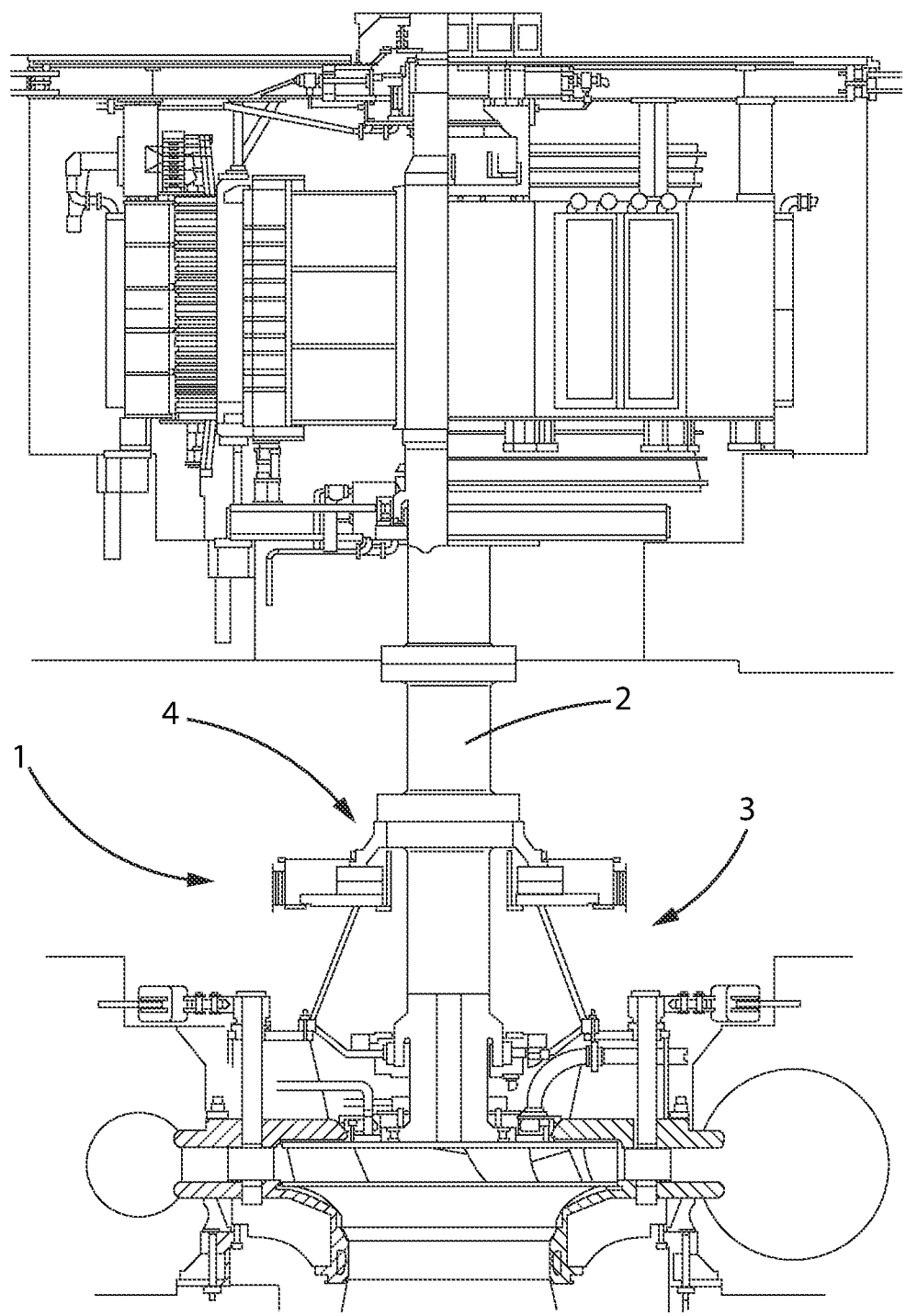

FIG. 1 shows the structure of a hydropower plant with an axial bearing. The axial bearing is designated 1. The axial bearing 1 serves to absorb the axially acting load (axial load) which bears on the shaft. The shaft is designated 2. In is the assembly shown, this axial load is caused, on the one hand, by the gravitational force of the components hanging on the shaft and, on the other hand, by the axial thrust of the impeller of the hydraulic machine during operation. This can be a turbine, a pump or a pump turbine. While the gravitational forces are known very precisely, this is not the case for the axial thrusts that occur, which can vary depending on the operating state. Axial bearing 1 is supported by a support structure, which is designated 3. The axial load is transmitted from shaft 2 to support structure 3 by means of a load transmission device. The load transmission device is designated 4.

Figure 2:
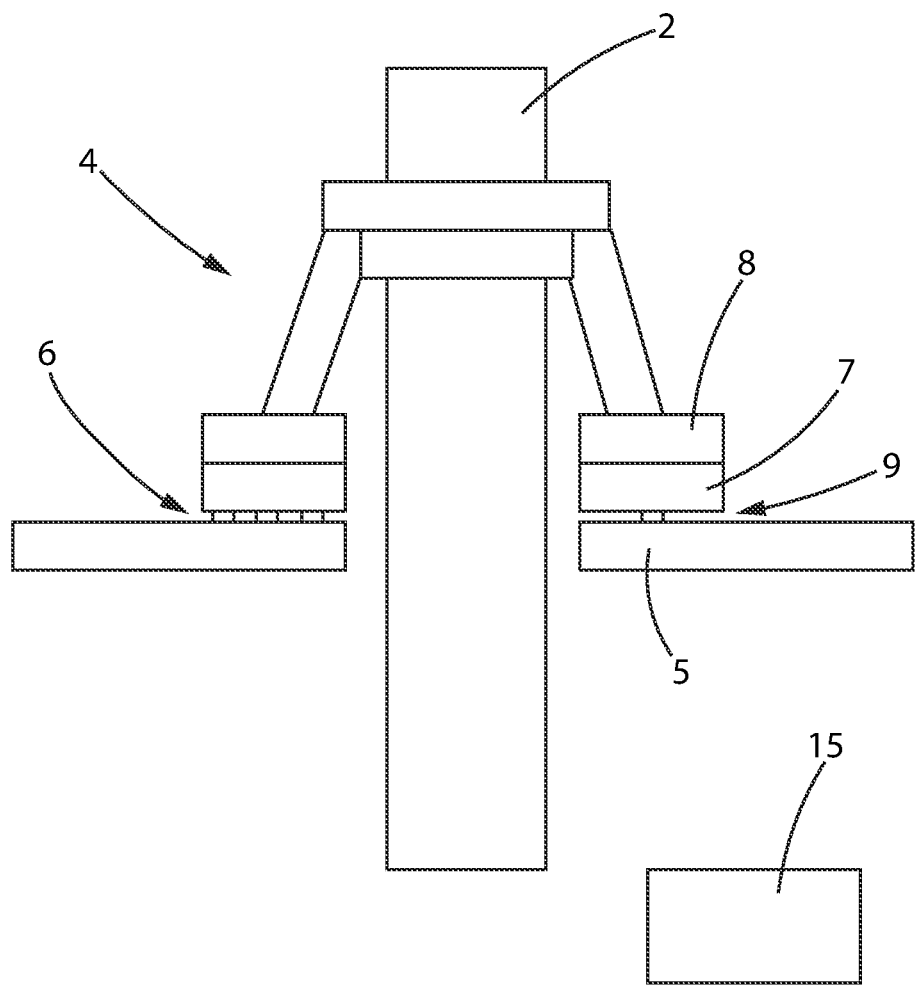
FIG. 2 axial bearing.

FIG. 2 shows a detail of the axial bearing from FIG. 1 in a highly schematic representation. The shaft is again designated 2. The support structure comprises a bearing plate, which is designated 5. Bearing plate 5 is arranged concentrically to shaft 2 and carries a plurality of spring elements, which are designated 6. Bearing plate 5 is often designed as a ring, but can also have a different outer contour. For the sake of better visibility, spring elements 6 are only shown on the left side of FIG. 2. Spring elements 6 support the bearing shoes, one of which is designated 7. The load transmission device, which is firmly connected to shaft 2, is again designated 4 and comprises a tracking ring, which is designated 8. Tracking ring 8 is arranged concentrically to shaft 2 so that it can rotate on bearing shoes 7. Axial bearing 1 further comprises at least one measuring device for measuring the average distance between bearing plate 5 and at least one of bearing shoes 7. The measuring device is designated 9. So that measuring device 9 can measure the average distance between bearing plate 5 and one of bearing shoes 7, the measuring device 9 must be arranged on or in the vicinity of the center of gravity of bearing shoe 7 in question.

The inventors have recognized that the axial load absorbed by axial bearing 1 can be determined very simply and effectively by measuring the average distance between bearing plate 5 and at least one of bearing shoes 7. Spring elements 6, which are located between bearing plate 5 and bearing shoes 7, are compressed by the action of the axial load. Without the action of an axial load, the distance between bearing plate 5 and bearing shoes 7 would correspond exactly to the axial extension of spring elements 6. The axial load can be easily calculated from the average distance measured under the action of the axial load and the known spring constant and the axial extension of the spring elements without load.

FIG. 2 also indicates a unit for acquiring the measurement data, i.e., the distances measured by measuring device 9, and it is designated 15. Unit 15 can be arranged away from bearing 1 and is not part of the bearing.

It is a further object of the inventors to configure measuring device 9 for measuring the average distance between bearing plate 5 and at least one of bearing shoes 7 such that measuring device 9 can be easily calibrated and integrated into the known bearing assemblies, and a measurement of the distance can take place reliably over a long period of time (cf. the comments on FIG. 6).

Figure 3:
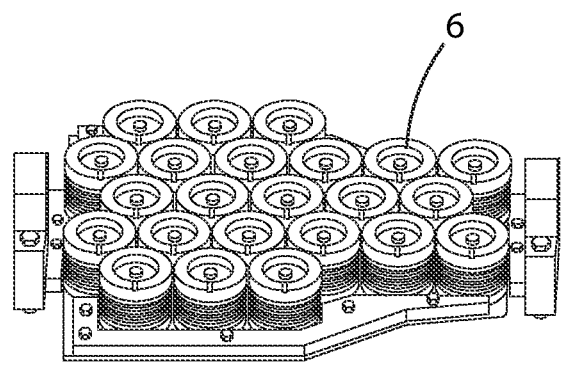
FIG. 3 group of spring elements.

FIG. 3 shows a group of spring elements in perspective view, one of which is again designated 6. In this embodiment, spring elements 6 are configured in accordance with U.S. Pat. No. 4,168,101. This is also referred to as a spring mattress support of the bearing shoes.

Figure 4:
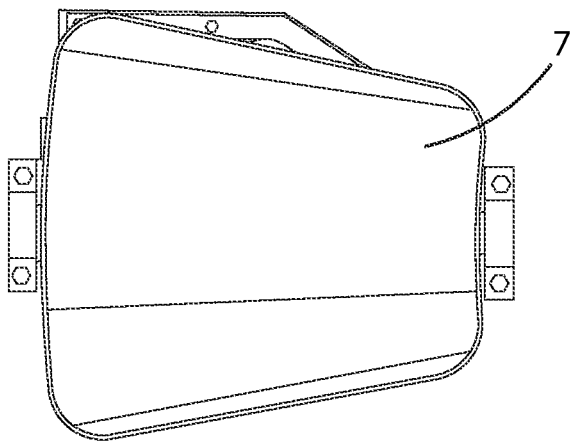
FIG. 4 bearing shoe.

FIG. 4 shows a bearing shoe in plan view, which is again designated 7.

Figure 5:
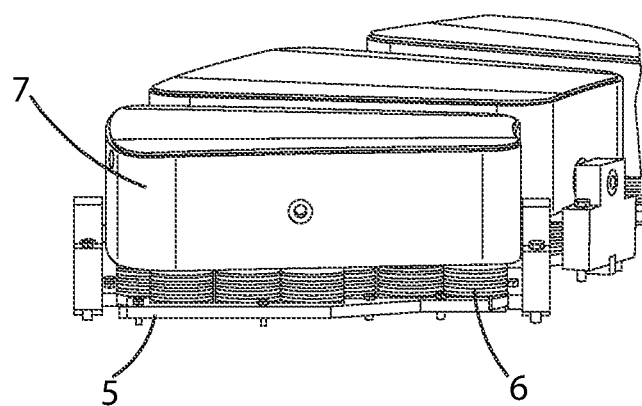
FIG. 5 bearing plate and group of spring elements with a bearing shoe.

FIG. 5 shows a perspective view of the bearing plate, which is again designated 5, a group of spring elements, one of which is again designated 6, and a bearing shoe, which is again designated 7.

FIG. 6 shows a section through a measuring device 9 for measuring the distance between bearing plate 5 and a bearing shoe 7 in section. Measuring device 9 comprises a distance sensor, which is designated 10, a housing, which is designated 11, a pressure cylinder, which is designated 12, at least one elastic element, which is designated 13, and a device for adjustment, which is is designated 14. The distance sensor 10 is connected to housing 11.

All known sensor types can be considered as distance sensor 10, it being particularly advantageous to use distance sensors which are based on a non-contact measuring principle, such as, e. g., sensors that are based on eddy current technology, or sensors that work optically or capacitively. However, sensors that work by contact, e.g., buttons or sensors, can be used equally well.

Hollow pressure cylinder 12 is designed and connected to housing 11 so that it can be moved in the axial direction (i.e., with respect to the axis of bearing 1) relative to housing 11. When installed, housing 11 is in contact with bearing plate 5, and pressure cylinder 12 is in contact with bearing shoe 7. Elastic element 13 is arranged between the housing 11 and the pressure cylinder 12 in such a way that it can counteract any approaching of bearing plate 5 and bearing shoe 7. Elastic element 13 can, for example, be a helical compression spring. In this case, a guide pin can be located inside the spring, which is connected either to housing 11 or to pressure cylinder 12.

Device for adjustment 14 serves, on the one hand, for preloading elastic element(s) 13 and to set the maximum possible axial extension of the assembly formed by housing 11 and pressure cylinder 12. In the embodiment shown in FIG. 6, device for adjustment 14 consists of a sleeve with an internal thread. The sleeve is screwed onto a corresponding counterpart on housing 11 by means of the internal thread. A protrusion on the sleeve engages pressure cylinder 12, which limits the aforementioned extension in the axial direction and, at the same time, preloads elastic elements 13 when the sleeve is screwed to housing 11 with the internal thread. However, device for adjustment 14 can also be designed in a different way. For example, the same purpose can also be achieved with the aid of the guide pins mentioned above, for example if they can be screwed into housing 11 at the bottom and protrude through openings in pressure cylinder 12 and have a protrusion for limitation (e.g., have a thick head) located there. It will not be difficult for the person skilled in the art to carry out the execution of further equivalent embodiments of device for adjustment 14.

Distance sensor 10 is connected to housing 11 in such a way that the sensor head (i.e., the end of distance sensor 10 suitable for measuring a distance) is arranged inside pressure cylinder 12 and, in the installed state, is oriented in the direction of bearing shoe 7.

In the embodiment shown in FIG. 6, pressure cylinder 12 is open towards bearing shoe 7 (i.e., upwards, in the figure shown). In the installed state, distance sensor 10 then measures the distance between the sensor head and bearing shoe 7. However, pressure cylinder 7 can also have a cover which can be connected to the same and which closes pressure cylinder 12 at the top. In this case, distance sensor 10 then measures the distance between the sensor head and the cover, which is directly adjacent to bearing shoe 7. Since the position of distance sensor 10 in housing 11, which is in turn in contact with bearing plate 5, and the thickness of a cover, if any, are known, the distance between bearing plate 5 and bearing shoe 7 can be determined from the measured distance.

Distance sensor 10 can be calibrated when measuring device 9 is not installed. For this purpose, the maximum possible axial extension of the assembly formed by housing 11 and pressure cylinder 12 is set with the aid of adjustment device 14 so that it corresponds to the axial extension of unloaded spring elements 6. This can be done particularly precisely if housing 11 has a corresponding stop. To this end, in the embodiment according to FIG. 6, sleeve 14 is screwed in until it rests on housing 11. A greater axial extension of the assembly comprising housing 11 and pressure cylinder 12 can be achieved by inserting a ring with a suitable thickness between sleeve 14 and housing 11. For example, a housing 11 of the same construction can be used for spring elements 6 with different extension in the axial direction. Then, e. g., a flat metal sheet is placed on pressure cylinder 12, the weight of which is insufficient to press down pressure cylinder 12 against the resistance of preloaded elastic element 13. The distance to the metal sheet is now measured with distance sensor 10. If pressure cylinder 12 has a cover, of course no metal sheet is required for calibration. The measured value acquired is the reference value and represents the axial extension of unloaded spring elements 6. If, in the installed state, measuring device 9 is in bearing 1, said measuring device is pressed together with spring elements 6 in the axial direction, the axial extension of the assembly formed by housing 11 and pressure cylinder 12 being reduced and distance sensor 10 measuring a distance which is less than the reference value. As described above, the present axial load can be calculated from the difference.

In addition to the ease of calibration, a further advantage of the assembly according to the invention is that distance sensor 10 is protected by the assembly comprising housing 11 and pressure cylinder 12, which considerably simplifies installation and ensures the functionality in the long term. Protection is particularly good if pressure cylinder 12 has a cover. However, the available measuring range of distance sensor 10 is reduced by the thickness of the cover, which is not always desirable.

The assembly according to the invention can be used particularly advantageously if measuring device 9 is integrated into a group of spring elements 6 according to FIG. 3. The dimensions of housing 11 and pressure cylinder 12 laterally to the axis are then chosen such that they correspond to the dimensions of a spring element 6 laterally to the axis. In this way, measuring device 9 can readily be installed in the spring mattress instead of a spring element 6. This results in the automatic positioning and mounting of measuring device 9 in the lateral direction.

Distance sensor 10 can be connected to unit 15 for acquiring the measurement data via wires or also wirelessly. A wireless connection can be made via Bluetooth, for example. In the case of connection by wires, said wires are passed through holes in bearing plate 5. In the embodiment according to FIG. 6, distance sensor 10 protrudes downward from housing 11, a plug connection and a cable comprising the wires also being indicated. Obviously, these parts are also arranged in a corresponding hole in bearing plate 5 in the installed state.

The invention claimed is:

1. An axial bearing for absorbing an axial load of a shaft, the axial bearing comprising:
    a support structure and a load transmission device for transmitting the axial load from the shaft to said support structure, said support structure including a bearing plate, a plurality of spring elements, and a plurality of bearing shoes;
    said spring elements being supported on said bearing plate and arranged in groups, with each group of said spring elements being covered by a respective bearing shoe;
    said load transmission device being connected to the shaft and including a tracking ring that is rotatably arranged on said bearing shoes;
    each of said bearing plate and said tracking ring being disposed concentrically with the shaft;
    a measuring device for measuring a mean distance between said bearing plate and a respective said bearing shoe, said measuring device being arranged in a vicinity of a center of support of one of said bearing shoes, and said measuring device including a distance sensor, a housing, a hollow pressure cylinder, an elastic element, and an adjustment device;
    said pressure cylinder being disposed for movement in an axial direction relative to said housing;
    said housing being in contact with said bearing plate and said pressure cylinder being in contact with the respective said bearing shoe;
    said elastic element being arranged between said housing and said pressure cylinder, and being configured to counteract any approaching of said bearing plate and said bearing shoe; and
    said distance sensor being connected to said housing and having a head of said distance sensor arranged inside said pressure cylinder and oriented towards said bearing shoe; and
    said adjustment device being configured to preload said elastic elements and limit an axial extension of an assembly formed by said housing and said pressure cylinder, with a maximum axial extension of said assembly being limited so as to correspond to an axial extension of said spring elements in an unloaded condition.

2. The axial bearing according to claim 1, wherein said distance sensor is configured for contact-less distance measurement.

3. The axial bearing according to claim 1, wherein said adjustment device comprises a sleeve with an internal thread, and wherein said housing has an external thread configured for meshing with said sleeve, and wherein said sleeve is formed with a protrusion configured to engage said pressure cylinder in order to preload said elastic elements by screwing said sleeve onto said external thread of said housing and to limit the axial extension of said assembly formed by said housing and said pressure cylinder.

4. The axial bearing according to claim 1, wherein said distance sensor is configured for wireless connection to an external unit for acquiring measurement data.

5. The axial bearing according to claim 1, wherein said distance sensor is configured for a connection to an external unit for acquiring measurement data by wires, and wherein said bearing plate is formed with an opening for passage of the wires.

6. The axial bearing according to claim 1, wherein said pressure cylinder includes a cover connected to said pressure cylinder and configured to close said pressure cylinder in the axial direction towards said bearing shoe.

7. The axial bearing according to claim 1, wherein each of said groups of spring elements has spring elements with mutually identical dimensions, and wherein dimensions of said housing and said pressure cylinder laterally to the axis correspond to the dimensions of the spring elements laterally to the axis.

* * * * *